(No Model.) 2 Sheets—Sheet 2.
M. R. HUBER.
SHOCKER ATTACHMENT FOR HARVESTERS.
No. 571,617. Patented Nov. 17, 1896.
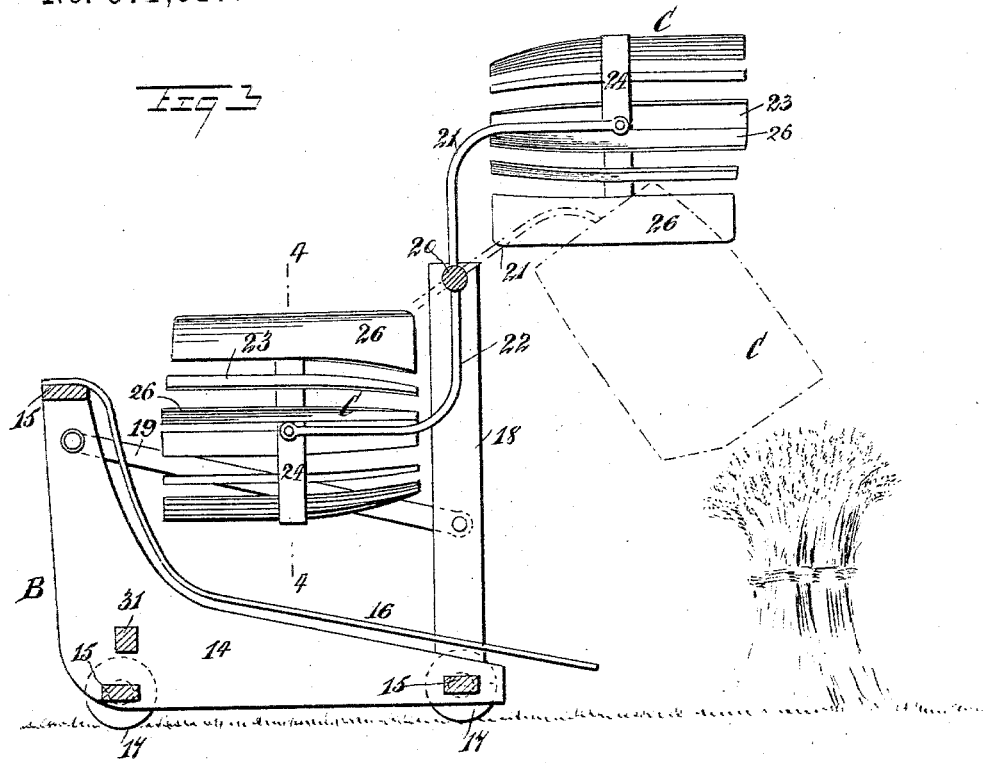
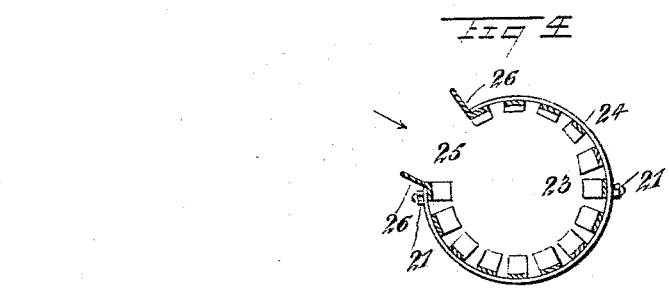
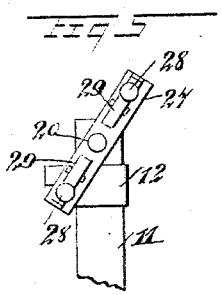
WITNESSES:
INVENTOR
Mary R Huber
BY
ATTORNEYS.

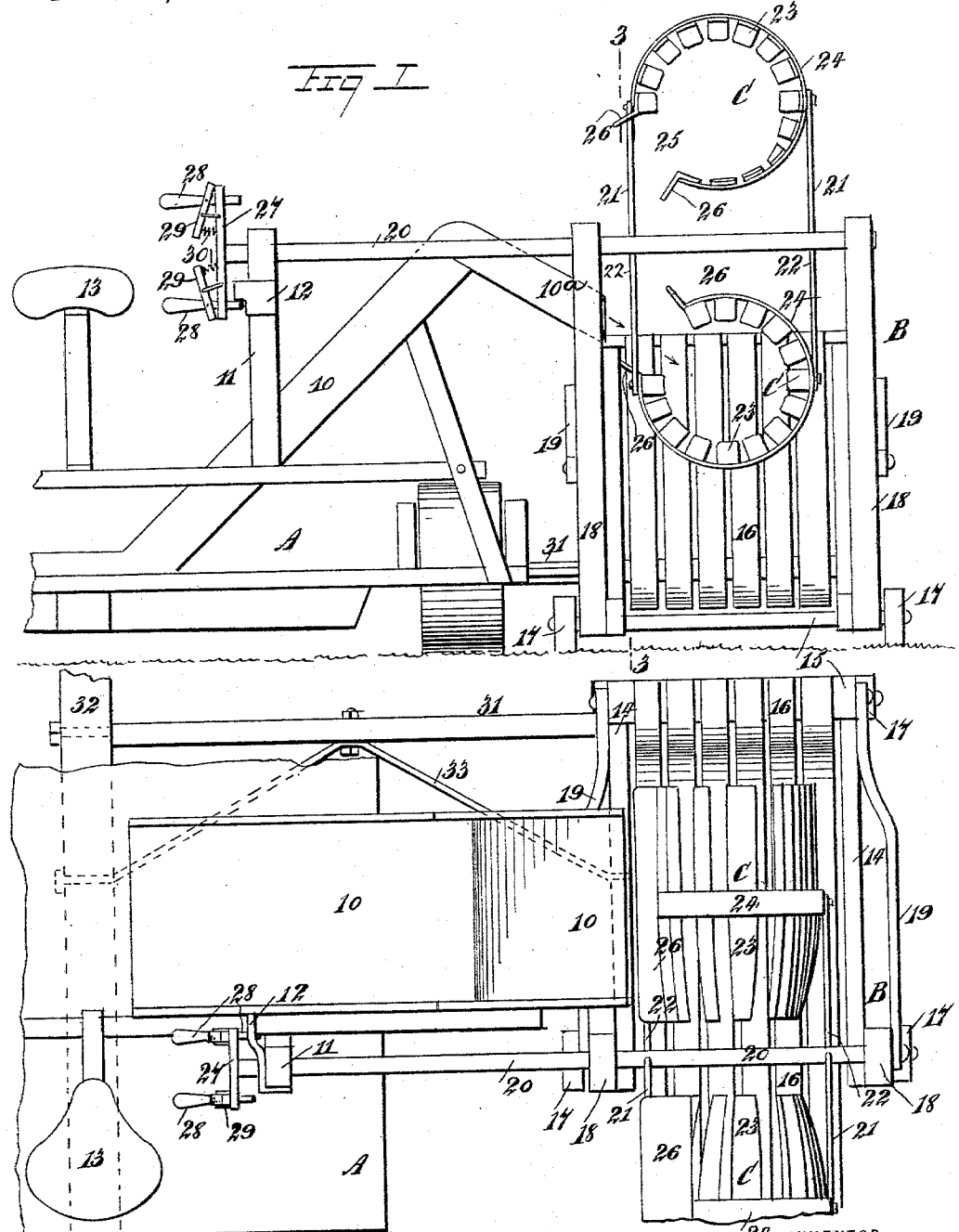

UNITED STATES PATENT OFFICE.

MARY ROSA HUBER, OF MARYSVILLE, KANSAS.

SHOCKER ATTACHMENT FOR HARVESTERS.

SPECIFICATION forming part of Letters Patent No. 571,617, dated November 17, 1896.

Application filed December 10, 1895. Serial No. 571,656. (No model.)

*To all whom it may concern:*

Be it known that I, MARY ROSA HUBER, of Marysville, in the county of Marshall and State of Kansas, have invented a new and useful Improvement in Shocker Attachments for Harvesters, of which the following is a full, clear, and exact description.

My invention relates to shockers for harvesters; and the object of the invention is to provide a car or truck adapted to travel with the harvester at one side thereof and to mount on the said truck receptacles arranged to receive a number of bundles or sheaves and deliver them in an upright position upon the ground to form a shock, and a further object of the invention is to provide for operating the receptacles from the platform of the harvester or a point adjacent to the driver's seat.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the improved shocker attachment and likewise a front elevation of a portion of the harvester-platform. Fig. 2 is a plan view of the shocker and harvester-platform as shown in Fig. 1. Fig. 3 is a transverse section taken in the plane of the line 3 3 in Fig. 1. Fig. 4 is a transverse section through one of the receptacles adapted to receive the shocks; and Fig. 5 is a view of one end of the shaft adapted to carry the said receptacles, and also is a side elevation of the locking devices for the shaft.

The harvester A is provided with an elevator-frame 10 and a binder-deck 10ª. The binder-deck is inclined, so that the sheaves after having been bound may slide from the deck, as indicated by arrows in Fig. 1. An upright 11 is secured to a suitable support on the harvester, the upright being located, preferably, adjacent to the driver's seat 13 and is provided with a keeper 12, as shown in Figs. 1, 2, and 5.

The shocker B comprises, essentially, a car or truck and receptacles carried thereby, each adapted to receive a number of sheaves. The car or truck preferably consists of two angular side pieces 14, connected by suitable cross-bars 15, and the upper edge of each side piece is curved from the top downward in the direction of its rear lower end. The truck is provided with a series of slats 16, forming, virtually, the floor thereof, and the slats ordinarily extend beyond the rear end of the frame of the truck, being attached to the said frame at its upper front portion, and the slats are shaped to correspond, substantially, to the curvature of the upper edges of the side pieces of the car. The car or truck is ordinarily provided with four wheels 17, adapted to travel on the ground, and an upright 18 is securely fastened to each side bar of the car or truck at the rear, being also connected with the forward higher portion of the truck by side braces 19, as shown best in Fig. 3.

A shaft 20 is journaled in the uprights 18 of the truck and likewise in the upright 11 of the harvester, and this shaft at a point over the floor of the truck is provided with two pairs of arms 21 and 22. These arms are in longitudinal alinement, and the arms forming a pair are substantially parallel, one arm of a pair being at each side of the central portion of the center of the truck. The arms are each bent at right angles and comprise a member directly secured to the shaft 20 and a member having the shock-receptacle attached. When the shaft 20 is in position to allow one receptacle to be loaded, the members of the arms 21 and 22, which members have the receptacles attached, will be disposed horizontally.

The receptacle is shaped somewhat like a barrel, but from a point near the center to the delivery end the lower wall of the receptacle is practically straight, whereby what would be the discharging end of the receptacle will be larger than the opposite end. Both ends of the receptacle are open, and said receptacle preferably consists of a number of staves 23 and one or more segmental bands 24, to which the staves are secured, the band being ordinarily located on the exterior of said staves, and the latter are placed at predetermined intervals apart.

A space 25 is formed between the ends of the band and is sufficiently wide to readily receive a sheaf and constitutes the mouth of the receptacle, and at each side of this mouth a fender 26 is longitudinally secured, the fenders being inclined from the mouth in opposite directions to a greater or less extent, as best shown in Fig. 4.

A cross-bar 27 is secured upon the end of the shaft 20 and extends over the harvester, and the cross-bar is provided with an opening at each end, and a pin 28 is loosely fitted in each opening. Each pin is pivotally connected to a lever 29, fulcrumed upon the cross-bar, and the inner ends of the levers are normally pressed outward from the cross-bar by means of springs 30, the said springs therefore serving to normally hold the pins 28 in a position to engage with the keeper 12 when brought opposite the said keeper and prevent the shaft from turning.

The shocker is connected to the harvester not only through the shaft 20, but also through the medium of a tie-bar 31, which is attached to one side of the shocker and to the tongue 32 of the harvester, and a brace 33 is secured to the tie-bar and the tongue and frame of the shocker, as shown in Fig. 2, in order that the shocker may have rigid attachment to the harvester and move readily therewith.

The mouths 25 of the receptacles are on the same side, namely, on the side that faces the elevator or conveyer frame 10, and when the shocker is in operation one of the receptacles will be immediately below or in front of the delivery end of the binder-deck 10ª and the bundles or sheaves of grain will be received in this lower receptacle, and the sheaves will be straightened in the receptacle by reason of their outer ends engaging with the upper portion of the floor 16 of the truck.

While one of the receptacles is being filled the other receptacle will be above the shaft and in a horizontal position and will contain a number of sheaves, and when the shaft is turned to carry the lower receptacle to the upper position the upper receptacle will be carried downward to take the place of the lower one, and in making the descent all the sheaves in this receptacle will be delivered on end to the ground and will stand upright thereon, forming a shock of considerable size.

The latch-pins 28 are used to turn the shaft as well as to engage with the keeper to hold the shaft stationary. When the shaft is to be turned, the pin 28 in engagement with the keeper is drawn outward, and when the shaft has been revolved the next pin will engage with the keeper and will be locked therein by its spring 30.

Having thus described my invention, I claim as new, and desire to secure by Letters Patent—

1. A shocker attachment for harvesters, the same consisting of a car or truck adapted for attachment to a harvester, uprights secured at the rear end of the truck, a shaft journaled in the said uprights, a locking device for the shaft, arms projected from opposite sides of the shaft, the end of one arm facing to the rear and the other facing to the front of the truck, and a receptacle secured to an end portion of each arm, each receptacle being provided with one open end and an opening in its side, the side opening being adapted to receive sheaves of grain which find an exit through the open end of the receptacles, as and for the purpose specified.

2. The combination with a harvester, of a truck connected to move with the same, a shaft mounted transversely in the truck and extending to the harvester, arms carried by the shaft, and shock-receptacles carried by the arms, each shock-receptacle having an opening in its side and being capable of delivering the shock from one end, substantially as described.

3. The combination with a harvester, of a truck connected to move with the same, the truck having two standards, a transversely-extending shaft journaled in the standards and extending to the harvester, a cross-bar connected to the inner end of the shaft, two spring-pressed pins carried by the cross-bar and capable of alternately locking with the harvester, arms carried by the outer end of the shaft and between the standards of the truck, and shock-receptacles carried by the arms and capable of being moved into juxtaposition with the discharge-chute of the harvester, substantially as described.

4. A shocker attachment for harvesters, the attachment having a truck capable of connection with the harvester, a shaft mounted on the truck, a cross-bar fixed to the inner end of the shaft, a spring-pressed pin carried by the cross-bar and capable of locking with the harvester, a shock-receptacle, and means projecting from the shaft by which means the shock-receptacle is carried, the shock-receptacle being movable into juxtaposition with the discharge-chute of the harvester, substantially as described.

5. A harvester attachment having a wheeled truck adapted to be connected with and move alongside of the harvester, a shaft revolubly mounted in the truck and extending over the harvester, means by which the shaft may be temporarily locked with the harvester, and a shock-receptacle carried by the shaft and receiving the shocks from the harvester, the shock-receptacle turning with the shaft to drop the shocks upon the ground, substantially as described.

MARY ROSA HUBER.

Witnesses:
GEORGIA THOMAS,
ANTON HUBER, Jr.,
J. A. BROUGHTEN.